2,899,451
Patented Aug. 11, 1959

2,899,451
RECOVERY OF URANIUM BY AROMATIC DITHIOCARBAMATE COMPLEXING

Orear Kenton Neville, Oak Ridge, Tenn., assignor to the United States of America as represented by the United States Atomic Energy Commission No Drawing. Application April 6, 1950
Serial No. 154,450

15 Claims. (Cl. 260—429.1)

The present invention relates in general to a uranium recovery process, and more particularly to a process for the separation and selective recovery of uranium values, especially when present in trace concentrations, from aqueous solutions containing the same, and from dissolved materials, such as bulk thorium and protactinium, associated therewith, by means of selectively complexing uranium with certain organic reagents and selectively recovering the resulting complexed uranium by organic solvent extraction.

It is to be understood that the terms uranium and thorium are used herein to designate those elements generically, whether in their elemental state or combined in compounds, or whether in natural isotopic proportion, or solely a particular isotopic species, unless otherwise indicated by the context.

As is known, there are various important operations in the art which require the selective recovery of uranium values from admixture with thorium values. Among these, the generally more difficult are those wherein small, even as little as trace, amounts of uranium must be separated from much larger masses of thorium. Such difficult separation is necessary, for example, in procedures for the derivation from thorium of certain valuable uranium isotopes, in particular $_{92}U^{233}$, $_{92}U^{232}$, and $_{92}U^{234}$. These isotopes are each conventionally generated in substantial isotopic purity by subjecting thorium, in either metallic or salt form, to a different particular nuclear transmutation reaction. In each case, it is generally feasible to transmute only a very minor portion of the thorium reactant, and thereafter separately recover and isolate the small amount of uranium isotope from the remaining mass of thorium.

Considering each of these isotopes in more detail, the $U^{233}$ isotope, being fissionable, is especially valuable as a neutronic reactor fuel. It is produced by irradiation of natural thorium (about 100% $Th^{232}$) with slow neutrons, preferably those generated in a nuclear fission reactor, according to the known, conventionally-represented reaction scheme:

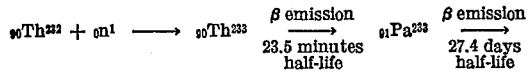

Since the product, $U^{233}$, is decomposed by fission induced by slow neutron irradiation, the irradiation is customarily terminated considerably prior to the time when the rate of $U^{233}$ destruction becomes equal the rate of thorium transmutation. In practice, for this reason, the irradiation is generally terminated before an atomic ratio of $U^{233}+Pa^{233}$ to $Th^{232}$ of as high as $1:10^3$ obtains, and is usually stopped at a ratio of about $1:10^5$. After permitting the necessary protactinium decay for a suitable period, the small amount of produced uranium is then separated and recovered from the bulk of the unreacted thorium.

The $U^{232}$ isotope, being a moderately long-lived alpha radiation emitter, is valuable as a radioactive tracer. It may be produced by bombarding $Th^{232}$ with deuterons, preferably from a charged particle accelerator, such as a cyclotron or a linear accelerator energized by a Van de Graff generator, according to the known reaction scheme:

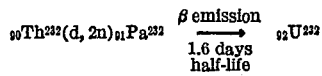

Because of the limited deuteron current producible by conventional accelerators, only a very minor amount of thorium is transmuted upon a bombardment of reasonable duration. After bombardment, the thorium target is detained for a short period to permit the necessary Pa decay, and the resulting uranium is separated from the bulk of the unreacted thorium.

The $U^{234}$ isotope is a longer-lived alpha emitter, and is also a valuable radioactive tracer. It occurs as an ultimate decay product of $_{92}U^{238}$ in accordance with the following scheme:

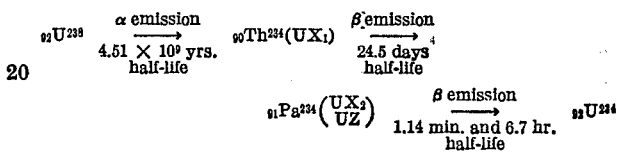

In the production of the $U^{234}$ isotope, the small content of $_{90}Th^{234}$ found associated with natural uranium, as a result of this decay over the ages, is isolated, ordinarily by a procedure which involves the addition of relatively large amounts of inactive thorium ($Th^{232}$) as a carrier in the concentration of $Th^{234}$ from solution. Later, after a suitable $Th^{234}$ decay period, the microscopic concentration of ensuant $U^{234}$ decay product is separately recovered from the bulk of the associated thorium.

Thus, all three of these exemplary processes, in common, require the separation recovery of small amounts of uranium from large amounts of thorium. Of various methods for effecting the recovery tried and used prior to the present invention, those involving the preferential extraction of uranium with organic solvents from aqueous thorium-uranium solutions have appeared to afford the most satisfactory results. Even so, however, the uranium extraction efficiencies of the most promising solvents, when employed under conditions which would avoid the concomitant extraction of prohibitive amounts of thorium, were found to be relatively low; generally about a half dozen consecutive batch extractions were required to achieve reasonably complete recovery of the desired uranium. While in some cases minor improvement was afforded by employing salting out agents, such as aluminum nitrate and calcium nitrate, the salting agents often deleteriously also increased the amount of thorium extracted and generally undesirably interfered with subsequent thorium recovery.

Thus, previously existing processes for effecting the subject separation have left much to be desired, and consequently improved recovery methods have been sought for. The present invention provides such an improved recovery method.

One object of the present invention is to provide a new and improved process for the selective recovery of uranium.

Another object is to provide such a process for the separation and selective recovery of uranium values from admixture with thorium, especially small amounts of uranium from much larger masses of thorium.

Still another object is to provide such a method which affords single stage separation and recovery efficiencies superior to methods heretofore conventional.

A further object is to provide such a process for the separation and selective recovery of uranium values from admixture with protactinium.

Still a further object is to provide a means for improving existing organic solvent extraction procedures for separate recovery of uranium, especially from thorium, and from protactinium if present, by simply incorporating an additional reagent in the process.

Yet another object is to provide an improved solvent for extracting uranium from aqueous solutions thereof.

Yet a further object is to provide an improved means for forming an organic complex selectively with uranium in systems containing both uranium and thorium ions, and/or uranium and protactinium ion.

Additional objects will become apparent hereinafter, as the description proceeds.

In accordance with the present invention, uranium is separately recovered from an aqueous solution containing uranyl and thorium ions by the process which comprises contacting the solution with an organic aromatic dithiocarbamate of the general formula:

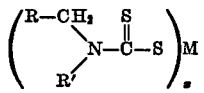

where:

R is an organic radical selected from the group consisting of aryl, aralkyl, and alkyl radicals;

R' is so selected from the group consisting of aryl and aralkyl radicals and a hydrogen atom, that at least one of the respective radicals selected to constitute R and R' possesses a benzene ring structure;

M is a metal atom selected from the group consisting of the alkali and alkaline earth metals; and $x$ is a number equal to the operative valence of the metal atom, M;

and recovering the resulting urano-dithiocarbamate complex by organic solvent extraction. Members of the specified class of aromatic dithiocarbamates have been found to be especially selective complexants for uranyl ions present in admixture with thorium ions.

That is, these particular dithiocarbamates exhibit a great affinity for uranyl ions to form urano-dithiocarbamate complexes, but have been demonstrated to be substantially non-reactive in this way with thorium ions. These dithiocarbamates form uranium complexes which are, in general, markedly insoluble in aqueous solutions, but quite soluble in organic solvents. As a result, upon effecting the organic solvent extraction, the urano-dithiocarbamate complexes are effectively driven into the organic solvents with high extraction efficiency. The present process when applied, for example, to a solution one molar in $Th^{+4}$ and $10^{-5}$ molar in $UO_2^{++}$, has been found capable in a single batch extraction, of effecting recovery of over 99% of the uranium, while removing as little as 0.3% of the thorium. Much of this small apparent thorium extraction is attributable to imperfect mechanical separation of the aqueous-organic phases, rather than to true thorium extraction. Being of such efficiency, the use of the present process advantageously requires fewer extraction stages than previous processes, and eliminates the need for employing troublesome salting agents.

Aqueous solutions, containing uranyl and thorium ions as specified, which may be effectively treated in accordance with the present invention are subject to wide variation. Naturally, solution conditions favorable to the existance of uranium and thorium in ionic form are beneficial; in this regard aqueous inorganic acid solutions have been found especially desirable. Nitric acid is preferred in that its oxidizing properties tend to maintain the dissolved uranium in the specified, oxidized uranyl state. It is particularly preferable, also, that the solution be maintained sufficiently acidic to prevent excessive adverse hydroylsis, and ensuant polymerization and precipitation, of the uranium or thorium. As is known in the art, pH's below about 3.5 generally are sufficient to avoid such excessive hydrolysis in solutions having uranyl and thorium concentrations as great as 1 molar; at progressively lower concentrations, progressively higher pH's become satisfactory in this respect. Generally speaking, uranium may be effectively extracted from aqueous solutions of virtually any solute concentration by the present process. To attain maximum uranium extraction efficiency, though, the solution desirably should be as concentrated as practicable, for such efficiency has been noted to increase somewhat with increase in solution concentration. Apparently, both increased uranium concentration in the aqueous phase and the greater salting-out effect of the increased thorium concentration serve to drive greater proportions of the complexed uranium into the organic phase. However, as the thorium concentration exceeds one molar, the amount of thorium simultaneously extracted commences to increase appreciably with the thorium concentration. It is therefore ordinarily advantageous, particularly when the concentration of uranium is much less than that of thorium, for the thorium concentration to be about one molar.

In instances where the desired uranium is originally contained in a solid medium, suitable solutions ordinarily may be prepared readily by conventional dissolution means. For instance, when the U-containing medium is a mass of thorium metal, or a thorium salt such as the hydroxide or carbonate, as normally obtain in the aforesaid U-isotope production operations, dissolution may be readily effected in moderately concentrated, say 12 N, nitric acid, then diluting and neutralizing with ammonium hydroxide to the preferred concentration and pH region; this procedure ordinarily results in substantially complete dissolution, as well as direct oxidation of the uranium content to the proper, uranyl oxidation state.

Having thus provided a suitable uranyl solution, the present process is applied thereto. A dithiocarbamate of the specified class is intimately contacted with the aqueous solution to effect the desired uranyl complexing. It has been discovered that among the dithiocarbamates generally, those, as specified, which have an aromatic, preferably aryl, group linked through a —$CH_2$— group to the nitrogen atom of the dithiocarbamate, and those which have an aromatic, preferably aryl, group attached directly to the nitrogen atom and also have a second organic radical linked through a —$CH_2$— group to the nitrogen are unusually efficacious for the present purpose. The combination, in this manner, of an aromatic group and a —$CH_2$— linkage in the dithiocarbamate molecule has demonstrated to lend itself to considerably improved uranium complexing. Within this class, the preferred dithiocarbamates, for affording superior results, are those having a phenyl group attached directly to the nitrogen atom of the dithiocarbamate. The superior results so afforded by such phenyl attachment may be further enhanced by utilizing, for the radical linked through said —$CH_2$— group, a short chained paraffinic, or phenyl group. Accordingly, the particularly preferred complexants are the ethyl(phenyl)-, butyl(phenyl)-, and benzyl(phenyl)-dithiocarbamate derivatives. More generally, though, specific examples of dithiocarbamates which are representative of broad types which may be satisfactorily employed in the present process follow. Referring to the presented structural formula, satisfactory complexants wherein R is an aryl radical and R' is a hydrogen atom, include benzyl-, (o, m, and p)methylbenzyl-, dimethylbenzyl-, ethylbenzyl-dithiocarbamates. Where both R and R' are aromatic radicals, satisfactory complexants include dibenzyl-, (o, m and p)methylbenzyl(phenyl)-, (o, m, and p)phenyl(benzyl)-, (o, m, and p)methylbenzyl(phenyl)-, and methylbenzyl(tolyl)-dithiocarbamates. Those wherein R is an alkyl and R' is an aryl include n-propyl(phenyl-, isopropyl(phenyl)-, ethyl($\alpha$-naphthyl)-, propyl($\beta$-naphthyl)-, and ethyl(tolyl)-dithiocarbamate.

The metallic component of the dithiocarbamate should be one of the alkali or alkaline earth metals; among these, the alkali metals, especially sodium, are preferred. Broadly, the alkali and alkaline earth metal dithiocarbamates are soluble in both aqueous solutions and general organic solvents.

Regarding the amount of dithiocarbamate to be employed, it has been found that, in general, the more dithiocarbamate employed, the better. The stoichiometric molar ratio of dithiocarbamate to uranium to form the complex is evidently 2:1; therefore it is desirable that at least this amount of dithiocarbamate be provided. However, dithiocarbamates generally exhibit an adverse tendency to decompose slowly in acidic aqueous solutions. Accordingly, for full effectiveness, it is advantageous to employ a substantial excess, over this theoretical amount. In instances where uranium concentration is very low, such as in the discussed uranium isotope recovery processes, enormous dithiocarbamate excesses may be provided with reasonable actual dithiocarbamate concentrations. For example, in the cited $U^{233}$ operation, where an aqueous solution of say $10^{-5}$ molar in uranium would be treated, an amount of dithiocarbamate equivalent to as little as 0.01 molar would still adequately provide a 500 fold excess.

The resulting urano-dithiocarbamate complex is then recovered from the aqueous solution by conventional organic solvent extraction procedures, involving intimately contacting the aqueous solution with a substantially water-immersible organic solvent, permitting the organic and aqueous phases to stratify, and then withdrawing the stratified organic extract containing the recovered uranium. Generally speaking, among satisfactory conventional types of organic solvents, those found best adapted for extraction of the formed urano-dithiocarbamate complex are the saturated aliphatic ketones, esters, alcohols, and poly-ethers. Typical of satisfactory ketones are methyl isobutyl ketone, heptanone-2, diethyl ketone, methyl n-propyl ketone, and methyl p-tolyl ketone. Satisfactory esters include ethyl-, propyl-, butyl-, and amyl-acetates, propionates, and butyrates. Satisfactory alcohols include pentanol-1, hexanol-1, heptanol-1, and isobutanol. Satisfactory poly-ethers include ethylene glycol dibutyl ether and diethylene glycol dibutyl ether.

In conducting the complexing and extraction operations of the present process, the selected dithiocarbamate may be added directly to the aqueous solution and the solution subsequently subjected to the organic solvent extraction procedure. However, it is to much advantage that the dithiocarbamate be introduced simultaneously with the organic solvent. This is advisable, in view of the general water-insolubility of the formed urano-dithiocarbamate complexes, in order to avoid deleterious precipitation of the complexes before extraction is effected. A convenient and effective procedure for the simultaneous introduction is to dissolve the dithiocarbamate in the organic solvent prior to introduction, and then intimately contact the aqueous solution with the resulting organic dithiocarbamate solution. Thus the organic solvent dithiocarbamate solution is, in effect, an improved organic solvent for uranium extraction. A simple batch extraction procedure for conducting the operations in this manner comprises adding to a volume of the aqueous solution an equal volume of organic solvent dithiocarbamate solution, thoroughly admixing and agitating the system say by shaking, and then, after the phases have stratified upon standing, separating the phases by either syphoning off the organic phase, or draining away the aqueous solution. The volume of solvent employed may often advantageously be considerably smaller than the volume of aqueous solution, particularly where the uranium concentration is very low. In this way the volume of solution associated with the extracted uranium may be reduced, thus concentrating the uranium.

While the mentioned dithiocarbamate decomposition normally does not proceed at a prohibitive rate, it has a general detractive effect upon uranium extraction efficiency, progressively increasing with contact time. Accordingly, for maximum process effectiveness it is advantageous to mitigate such decomposition as far as practicable. In the decomposition, the dithiocarbamates appear to be hydrolysed to the corresponding dithiocarbamic acids, which in turn decompose; accordingly, the rate of decomposition increases with decrease in pH of the aqueous solution. However, while increasing the pH of the aqueous solution therefore beneficially decreases the dithiocarbamate decomposition rate, it also disadvantageously increases the rate of deleterious hydrolysis of thorium and uranium solutes. Upon balancing these two conflicting effects, for solutions not over 1 M in Th or U, an optimum pH range of about 3.0 to 3.5 has been found to afford the slowest dithiocarbamate decomposition rate at a still permissible solute hydrolysis rate. Fortunately, in the present process, uranium complex formation and its extraction are very rapid; with uranium solutions as concentrated as 0.001 M, contact of only about two minutes with an organic solvent-dithiocarbamate solution has proven to be of adequate duration for substantial completion of the complexing and extraction. Contact time may advantageously be curtailed accordingly, thereby limiting the extent of adverse decomposition which may obtain during the contact period. If it is desired to employ extractions of much longer duration, the dithiocarbamate decomposition may be effectively counteracted by adding additional fresh dithiocarbamate complexant to the system during the period of agitation.

In any case, through, dithiocarbamate decomposition is considerably slower when the dithiocarbamate is initially dissolved in the organic solvent, rather than the aqueous solution. It has further been noted that the stability of the dithiocarbamate appears to vary with the identity of the particular dithiocarbamate. For example, when in the same organic solvent (ethyl acetate), benzyl-(phenyl)dithiocarbamate has been noted to decompose during contact with an aqueous solution of pH 3, only about ⅔ as rapidly as does dibenzyldithiocarbamate. Also, dithiocarbamate stability apparently varies with the particular organic solvents used. For example, dibenzyldithiocarbamate, when in ethyl acetate, decomposes only about 40% as rapidly, during contact with an aqueous solution of pH 3, as when in methyl isobutyl ketone. Thus, the resulting stability of the dithiocarbamate is generally a criterion in the selection of both the dithiocarbamate and the solvent with which it is employed.

Upon completion of complexing and extraction operations of the present process, the extracted uranium may then be stripped from the separated organic phase by scrubbing with a fairly concentrated aqueous mineral acid which dissolves the uranyl ion, for example one-normal nitric acid. Upon intimately contacting the stripping solution with the organic phase, the acid promotes rapid dithiocarbamate decomposition in the organic phase, and then strips the liberated uranyl ions from the organic solvent. If it is desired to further decontaminate the extracted and stripped uranium of the small proportion of thorium that has accompanied it into the acid stripping solution, the present process may be applied to the stripping solution to again recover almost all of the uranium while extracting only a small proportion of the thorium present. The extracted uranium may be thus treated by a sufficient number of repetitions of the present process to attain the desired purity with respect to thorium.

Likewise, if uranium recovery from the original aqueous solution greater than is effected by a single application of the described complexing-extraction operation is desired, a plurality of the operations may be applied thereto in succession, in the manner customary in multiple batch extractions. Furthermore, while this process has been described with particular reference to batch extraction techniques, it is also adaptable to conventional continuous column extraction procedures. In such procedures continuously flowing streams of the organic solvent and the aqueous solution are intimately contacted and then separately withdrawn; the dithiocarbamate complexant may be incorporated in either the aqueous or organic influent streams, again preferably in the organic.

It is thought that the mechanism of urano-dithiocarbamate complex formation is principally one of salt formation, with the uranyl radical replacing the metal atom in the dithiocarbamate, and supposedly being additionally bound by inner chelation with the nitrogen atom. The complexes could therefore be considered to be uranyl dithiocarbamate salts, with two dithiocarbamate groups being joined to each uranyl radical. However, it is not intended that this invention be limited to any particular theory concerning the nature of the complex formed; in view of the uncertainty regarding the complete mechanism of the uranium-dithiocarbamate bonding, the more general term "complexing" has been adhered to herein.

Further illustration of the quantitative aspects and preferred reagents and procedure of the present process is provided in the following specific examples. Example I demonstrates the efficacy of the process for separating minute concentrations of uranium from macroscopic bulks of thorium, under conditions and in relative amounts normally encountered in the U-isotope production operations referred to hereinbefore. The relative uranium extraction effectiveness of each of several representative dithiocarbamates and solvents are compared both with each other, and with the effectiveness of the same solvents without any dithiocarbamate complexant. The proportion of the thorium accompanying the uranium into the extract in the various instances is also recorded.

EXAMPLE I

A large volume of an aqueous nitric acid thorium-uranium stock solution was analysed to be 1.0 molar in thorium as $Th^{+4}$ and $2.78 \times 10^{-5}$ molar in uranium as $UO_2^{++}$ comprising $U^{233}$ tracer, and to have a pH of 3. Equal volumes of the stock solution were subjected to comparative extractions employing the following procedure in each case. The portion of stock solution was introduced into a separatory funnel; an equal volume of organic solvent and the indicated amount of dithiocarbamate complexant were then added simultaneously to the funnel. In some cases the dithiocarbamate was previously dissolved in the solvent, while in others, the dithiocarbamate, in crystalline form, was weighed and introduced on top of the solvent layer in the separatory funnel. The results obtained were independent of the particular dithiocarbamate introduction technique used. The funnel was stoppered and shaken on a mechanical shaker for a period of five minutes, then allowed to stand for a period of two minutes to permit stratification of the organic and aqueous phases. The organic layer was then separated, and analysed for its uranium and thorium content. Precise uranium analysis at the low concentrations encountered was effected by means of a determination of the $U^{233}$ tracer radioactivity. The results are tabulated in Table I below. The uranium and thorium contents are given as percentages of the total content in the original portion of aqueous solution. In the first series of runs no dithiocarbamate was employed. In the second series, dithiocarbamate was employed in each case in an amount equivalent to 0.0278 molar (1,000 times the molar concentration of uranium).

Table I

| Dithiocarbamate | | | Percent Uranium Extracted | | Percent Thorium Extracted | |
| --- | --- | --- | --- | --- | --- | --- |
| Identity | Molecular Weight | Grams added per liter of solution | Methyl isobutyl ketone | Ethyl Acetate | Methyl isobutyl ketone | Ethyl Acetate |
| None | | | 28.2 | 31.8 | 0.47 | 0.36 |
| Sodium Benzyldithiocarbamate | 205 | 5.7 | 42.0 | 52.6 | 0.49 | 0.36 |
| Sodium Dibenzyldithiocarbamate | 295 | 8.2 | 64.2 | 86.6 | 0.45 | 0.35 |
| Sodium Benzyl (phenyl) dithiocarbamate | 281 | 7.8 | 92.3 | 101.2 | 0.51 | 0.32 |
| Sodium Ethyl (phenyl) dithiocarbamate | 219 | 6.1 | 93.8 | 98.9 | 0.50 | 0.32 |
| Sodium Butyl (phenyl) dithiocarbamate | 247 | 6.8 | 89.2 | 100.3 | 0.47 | 0.33 |

The efficacy of the present process and the improvement it affords over the use of the plain organic solvents is evidenced by the results set forth in Table I. It may be observed that the better results are obtained where the R' of the structural formula set forth hereinbefore is an aryl group rather than a hydrogen atom, particularly where a benzene ring is attached directly to the nitrogen atom. It may be further noted that in each case, ethyl acetate gave slightly better results than methyl isobutyl ketone. Thorium extraction was found to be substantially independent of dithiocarbamate complexants used, but somewhat dependent upon the solvent employed. Example II further demonstrates the relative effectiveness of different solvents.

EXAMPLE II

The procedure of Example I was duplicated, employing one of the dithiocarbamates employed in Example I together with various representative solvents. However, in this series of runs, an amount of dithiocarbamate ten times as great as in Example I was employed in each case. The results obtained are tabulated in Table II below.

Table II

Complexant: Sodium ethyl(phenyl)dithiocarbamate
Amount Used: 61 grams per liter of solutions (10,000 times the molar uranium concentration)

| Solvent | Percent Extracted | |
| --- | --- | --- |
| | Uranium | Thorium |
| Methyl Isobutyl Ketone | 99.7 | 0.48 |
| Heptanone-2 | 99.9 | 0.48 |
| Ethyl Acetate | 100.8 | 0.34 |
| Amyl Acetate | 98.2 | 0.35 |
| Ethylene Glycol Dibutyl Ether | 89.8 | 0.33 |
| Diethylene Glycol Dibutyl Ether | 88.8 | 0.36 |
| Hexanol-1 | 80.6 | 0.40 |

The results of Table II are characteristic of the individual preferred solvent types; that is, the ketones and esters are generally somewhat superior to the poly-ethers and alcohols. The substantial non-reactivity of the dithiocarbamate with thorium is also evidenced. The concentration of dithiocarbamate employed was more than quarter molar, a concentration adequate to have demonstrated any effect of the dithiocarbamate in increasing the proportion of the one-molar thorium extracted, if it occurred. However, no such action resulted; the amounts of thorium extracted were found to be substantially the same as in Table I.

The effect of varying the complexant concentration is illustrated in Example III.

EXAMPLE III

A series of comparative extractions, following the procedure of Example I, were conducted with one dithiocarbamate and each of two solvents. In each series a different quantity of dithiocarbamate was employed in each individual extraction. The results are tabulated below in Table III.

*Table III*

Complexant: Sodium ethyl(phenyl)dithiocarbamate
[Percent uranium extracted.]

| Solvent | Moles Complexant/Moles Uranium | | | | |
|---|---|---|---|---|---|
|  | 10,000 | 1,000 | 100 | 10 | 0 |
| Ethyl Acetate | 100.8 | 99.5 | 69.6 | 28.5 | 31.8 |
| Methyl Isobutyl Ketone | 99.7 | 93.5 | 78.3 | 29.6 | 28.2 |

The decrease in effectiveness of the complexant with decrease in the relative amount used shown in Table III is believed to result from the decomposition of the dithiocarbamates in the acid system. When large excesses are employed, sufficient dithiocarbamate for substantially complete uranium complexing remains at the end of the extraction period, in spite of the considerable degree of decomposition which has taken place. However, when treating the $10^{-5}$ molar uranium solutions encountered in the mentioned uranium isotope production procedures, dithiocarbamate concentrations as low as $10^{-2}$ molar still provide much more than enough dithiocarbamate for efficient extraction of seven minutes duration. Even less than this amount may be employed if the complexant is added over the entire extraction period, rather than all at the beginning, or extractions of shorter duration are employed. The effect of varying the duration of the extraction is illustrated in Example IV.

EXAMPLE IV

Using the procedure of Example I, a series of extractions of varying duration were conducted. The results are tabulated below in Table IV.

*Table IV*

Complexant: Sodium ethyl (phenyl)dithiocarbamate
Amount used: 61 grams/liter of Solution (10,000 times the molar uranium concentration)
Shaking time: As Indicated
Standing time: 2 minutes

[Percent uranium extracted.]

| Solvent | Shaking Time (Minutes) | | | | | |
|---|---|---|---|---|---|---|
|  | 2 | 5 | 10 | 15 | 30 | 60 |
| Ethyl Acetate | 101.2 | 99.8 | 99.9 | 97.6 | 92.0 | 82.0 |

Thus, when an excess of dithiocarbamate of the order of 10,000 times the molar uranium concentration is employed, extractions of as long as thirty minutes' duration may be employed without incurring serious loss of extraction efficiency ensuing from complexant decomposition. It is also noteworthy that the time for the two phases to come to extraction equilibrium in this example was less than two minutes. Therefore, it is generally advantageous to limit the extraction time to between about 2 and 5 minutes and accelerate the phase stratification by by means such as centrifugation to avoid deleterious decomposition as much as possible.

In Example V a series of extractions were conducted to illustrate the effect on extraction efficiency of decreasing the relative volume of solvent employed with a given volume of aqueous solution.

EXAMPLE V

A series of extractions were conducted following the general procedure of Example I, except that the volume of solvent employed was one-half that of the aqueous solution. The results are tabulated below in Table V.

*Table V*

Complexant: Sodium ethyl(phenyl)dithiocarbamate
Shaking time: 5 minutes
Settling time: 2 minutes

| Amount of Complexant | | | Solvent | Percent Uranium Extracted |
|---|---|---|---|---|
| Grams Per liter of Solvent | Grams Per Liter of Solution | Moles Per Mole of Uranium | | |
| 6.1 | 3.05 | 500 | Ethyl Acetate | 94.8 |
| 60.8 | 30.4 | 5,000 | ____do____ | 99.2 |
| 6.1 | 3.05 | 500 | Methyl Isobutyl Ketone | 90.2 |
| 60.8 | 30.4 | 5,000 | ____do____ | 96.8 |

Comparing Table V with Tables I and II, and considering that only half as much complexant per mole of uranium was employed in Example V as in I and II, it may be observed that halving the volume of solvent employed has very little effect on the extraction efficiency. Thus reduced volumes of solvent may be advantageously employed to effect a concentration of the uranium along with the extraction, without incurring a serious drop in extraction efficiency.

The ease with which the extracted uranium may be stripped from the separated organic phase is illustrated in Example VI. In further interest of effecting uranium concentration, the effect of using a smaller volume of stripping solution than solvent was also investigated.

EXAMPLE VI

A series of extractions were conducted, following the general procedure of Example I, using equal volumes of solvent and solution. In each extraction a shaking time of five minutes and a standing time of two minutes was employed. After each extraction the aqueous bottom layer was drained from the separatory funnel, and a stripping solution was added to the organic phase remaining in the funnel. The funnel was shaken for five minutes, allowed to stand for two minutes, and the aqueous stripping solution was drained and collected. In each case, the percent of extracted uranium which was stripped into the stripping solution was determined. The results are tabulated below in Table VI.

Table VI

Complexant: Sodium ethyl(phenyl)dithiocarbamate

| Solvent | Grams of Complexant per Liter of Solvent | Stripping Solution | Volume of Stripping Solution per Volume of Solvent | Percent Uranium Stripped |
|---|---|---|---|---|
| Ethyl Acetate | 6.1 | 1 M $HNO_3$ | 1 | 98.2 |
| Do | 6.1 | 0.5 M $HNO_3$ | 1 | 94.3 |
| Do | 60.8 | 1 M $HNO_3$ | 1 | 93.7 |
| Do | 60.8 | 0.5 M $HNO_3$ | 1 | 89.8 |
| Methyl Isobutyl Ketone | 6.1 | 1 M $HNO_3$ | 1 | 97.2 |
| Do | 6.1 | 0.5 M $HNO_3$ | 1 | 96.5 |
| Do | 60.8 | 1 M $HNO_3$ | 1 | 95.2 |
| Do | 60.8 | 0.5 M $HNO_3$ | 1 | 91.9 |
| Ethyl Acetate | 6.1 | 10% $(NH_4)_2CO_3$ | 1 | 96.2 |
| Do | 60.8 | 10% $(NH_4)_2CO_3$ | 1 | 98.9 |
| Do | 6.1 | 1 N $HNO_3$ | 0.5 | 85.3 |
| Do | 6.1 | 0.5 N $HNO_3$ | 0.5 | 80.4 |
| Do | 6.1 | 10% $(NH_4)_2CO_3$ | 0.5 | 94.8 |

So, it may be seen that the destruction of the uranium complex and residual complexant and the stripping of the liberated uranium by these stripping agents is rapid and substantially complete. However, the reduction in efficiency resulting from halving the volume of reagent employed was found to be more pronounced in stripping than in extraction.

For application of this process to uranium isotope production, it is of interest to investigate the extent that any protactinium present would be extracted with the uranium. Example VII is illustrative of the degree of protactinium extraction which occurs.

EXAMPLE VII

The effect of the dithiocarbamates on protactinium extraction was tested as follows. To an amount of the solution described in Example I was added radioactive protactinium, ($Pa^{+5}$) tracer, to a concentration of 50,000 disintegrations/min./ml. A series of extractions were conducted upon equal portions of the solution following the general procedure of Example I. Equal volumes of solution and solvent were used, in each case the shaking time was five minutes and the standing time two minutes. The percent protactinium extractions which were accomplished with various amounts of reagent are shown in Table VII.

Table VII

Complexant: Sodium ethyl(phenyl)dithiocarbamate

| Amount of Complexant | | Solvent | Percent Protactinium Extracted |
|---|---|---|---|
| Grams Per Liter of Solution | Moles Per Mole of Uranium | | |
| 6.1 | 1,000 | Ethyl Acetate | Less than 0.1. |
| 60.8 | 10,000 | do | Do. |
| 60.8 | 10,000 | Methyl Isobutyl Ketone | Do. |
| None | ------ | Ethyl Acetate | Do. |
| None | ------ | Methyl Isobutyl Ketone | Do. |

It is evident that the protactinium remained in predominantly the aqueous phase under all conditions tested; the organic layer carried only a very small percentage of the protactinium either with or without reagent present. Therefore, if so desired in the described uranium isotope production operations, the uranium may be recovered from solution before the protactinium has substantially completely decayed. Thus, a solution of irradiated thorium, say, could be subjected to the present process at several different times, allowing a sufficient period between each extraction to permit a suitable fresh amount of uranium to form by radioactive decay. Furthermore, being that protactinium is thus not extracted, the applicability of the present process is considerably extended; this process is generally applicable to improved separation of uranium from protactinium, regardless of whether or not thorium is also present in the system.

While this invention has been described with particular reference to its application to the recovery of uranium present in very small amounts in solutions containing large amounts of thorium, it is inherently of much wider applicability. The process is also well adapted to affording improved uranium extraction from solutions wherein the disparity between the uranium and thorium concentrations is not so great, for example in processes for the recovery of uranium from certain thorium-uranium ores. In fact, the present process may be beneficially applied to thorium-uranium solutions of any relative proportion; with solutions containing uranium in high concentrations, the incorporation of dithiocarbamate enhances the extraction of the bulk of the uranium, and of course, it is especially valuable in effecting subsequent extraction of whatever small amounts of uranium remain in the aqueous phase after the first bulk extraction.

More generally, however, the present invention has various other important aspects besides its application to the selective extraction of uranium from thorium. This invention provides a particular group of complexants which are especially selective for uranium, but substantially non-reactive with thorium. These complexants may be employed in various diverse uranium processes, not necessarily solvent extraction, where selective complexing of uranium in a uranium-thorium system is desired. Furthermore, the improved uranium complexing and extraction operations of this invention may be beneficially applied, in an identical manner and with like efficacy, to improved recovery of uranium values from aqueous solution; where no thorium whatever is involved or introduced. Such process may well be applied, for example, to concentration of uranium from aqueous process solutions, stripping valuable uranium from waste solutions and recovery of radioactive uranium tracers after use. This invention also provides an improved organic solvent for extracting uranium from aqueous solution comprising an organic solvent solution of a member of the specified class of dithiocarbamates; since such an improved uranium solvent may be employed in place of previously-conventional organic solvents, it has many beneficial applications in the general processing of uranium. In addition, this invention provides a means for improving existing conventional organic solvent uranium extraction procedures which necessitates virtually no essential change in the equipment or operating procedure employed, comprising the one simple step of incorporating one of the specified dithiocarbamates in the system during the extraction procedure. Various additional applications of the hereinbefore disclosed process will become apparent to those skilled in the art.

For further information regarding this type of process, reference is made to applicant's co-pending applications:

Serial No. 154,449, filed April 6, 1950, for "Recovery of Uranium by Secondary Xanthate Complexing."

Serial No. 154,451, filed April 6, 1950, for "Recovery of Uranium by Cycloalkyldithiocarbamate Complexing."

As used herein, the following terms are intended to have the meanings indicated:

"Aromatic"—an organic compound characterized by the presence of at least one benzene ring structure;

"Aryl"—any univalent aromatic hydrocarbon radical whose free valence belongs to the nucleus and not to a side chain, e.g. phenyl or tolyl;

"Alkyl"—an organic hydrocarbon radical having an open chain structure, e.g. including derivatives of the paraffin, olefine, and acetylene series;

"Aralkyl"—an aromatic derivative of an alkyl radical, whose free valence belongs to the side chain and not to the aromatic nucleus.

It is therefore to be understood that all matters contained in the above description and examples are illustrative only and do not limit the scope of the present invention.

What is claimed is:

1. A selective complexing-organic solvent extraction process for the selective recovery of uranium values from an aqueous solution containing the same in the form of uranyl ions, which comprises contacting said solution with an aromatic dithiocarbamate of the general formula:

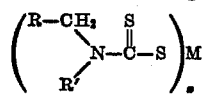

where:

R is an organic radical selected from the group consisting of aryl, aralkyl, and alkyl radicals;

R' is so selected from the group consisting of aryl and aralkyl radicals and a hydrogen atom, that at least one of the respective radicals selected to constitute R and R' possesses a benzene ring structure;

M is a metal atom selected from the group consisting of the alkali and alkaline earth metals; and $x$ is a number equal to the operative valence of the metal atom, M;

and extracting resulting urano-dithiocarbamate complex with an organic solvent.

2. A selective complexing-organic solvent extraction process for the separation and selective recovery of uranium values from an aqueous solution containing the same in the form of uranyl ions, together with dissolved thorium values, which comprises contacting said solution with an aromatic dithiocarbamate of the general formula:

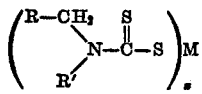

where:

R is an organic radical selected from the group consisting of aryl, aralkyl, and alkyl radicals;

R' is so selected from the group consisting of aryl and aralkyl radicals and a hydrogen atom, that at least one of the respective radicals selected to constitute R and R' possesses a benzene ring structure;

M is a metal atom selected from the group consisting of the alkali and alkaline earth metals; and $x$ is a number equal to the operative valence of the metal atom, M;

extracting resulting urano-dithiocarbamate complex with an organic solvent, and separating the resulting uranium-containing organic solvent phase from the thorium-containing aqueous phase.

3. A selective complexing-organic solvent extraction process for the separation and selective recovery of uranium values from an acidic aqueous solution containing the same in the form of uranyl ions, together with dissolved thorium values, which comprises contacting said solution with an aryl dithiocarbamate of the general formula:

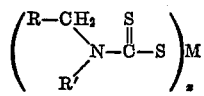

where:

R is an organic radical selected from the group consisting of aryl, aralkyl, and alkyl radicals;

R' is an aryl groups attached directly to the nitrogen atom of the dithiocarbamate group;

M is a metal atom selected from the group consisting of the alkali and alkaline earth metals; and $x$ is a number equal to the operative valence of the metal atom, M;

extracting resulting urano-dithiocarbamate complex with an organic solvent chosen from the group consisting of saturated aliphatic: ketones, esters, alcohols, and polyethers, and separating the resulting uranium-containing organic solvent phase from the thorium-containing aqueous phase.

4. A selective complexing-organic solvent extraction process for the separation and selective recovery of uranium values from an aqueous nitric acid solution containing the same in the form of uranyl ions together with dissolved thorium values, which comprises contacting said solution with an aryl dithiocarbamate of the general formula:

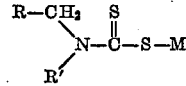

where: R and R' are phenyl radicals; and M is an alkali metal atom; extracting resulting urano-dithiocarbamate complex with an organic solvent, and separating the resulting uranium-containing organic solvent phase from the thorium-containing aqueous phase.

5. A selective complexing-organic solvent extraction process for the separation and selective recovery of uranium values from an aqueous nitric acid solution containing the same in the form of uranyl ions, together with dissolved thorium values, which comprises contacting said solution with an aryl dithiocarbamate of the general formula:

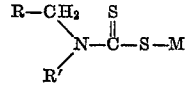

where: R is a paraffinic radical; R' is a phenyl radical; and M is an alkali metal atom; extracting resulting urano-dithiocarbamate complex with an organic solvent, and separating the resulting uranium-containing organic solvent phase from the thorium-containing aqueous phase.

6. A selective complexing-organic solvent extraction process for the separation and selective recovery of uranium values from an aqueous nitric acid solution containing the same in the form of uranyl ions, together with dissolved thorium values, which comprises contacting said solution with an aryl dithiocarbamate of the general formula:

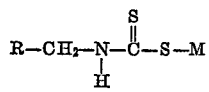

where: R is an aryl radical; and M is an alkali metal atom; extracting resulting urano-dithiocarbamate complex with an organic solvent, and separating the resulting uranium-containing organic solvent phase from the thorium-containing aqueous phase.

7. A selective complexing-organic solvent extraction process for the separation and selective recovery of uranium values from an aqueous nitric acid solution of pH substantially within the range of 3.0 to 3.5 containing the same in the form of uranyl ions, together with dissolved thorium values, which comprises contacting said solution with sodium ethyl(phenyl)dithiocarbamate in amount in substantial excess over twice the molar concentration of uranyl ions, extracting resulting urano-dithiocarbamate complex with an organic solvent chosen from the group consisting of saturated aliphatic: ketones, esters, alcohols, and poly-ethers, and separating the resulting uranium-containing organic solvent phase from the thorium-containing aqueous phase.

8. A selective complexing-organic solvent extraction process for the separation and selective recovery of uranium values from an aqueous nitric acid solution of pH substantially within the range of 3.0 to 3.5 containing the same in the form of uranyl ions, together with dissolved thorium values, which comprises contacting said solution with sodium butyl(phenyl)dithiocarbamate in amount in substantial excess over twice the molar concentration of uranyl ions, extracting resulting urano-dithiocarbamate complex with an organic solvent chosen from the group consisting of saturated aliphatic: ketones, esters, alcohols, and poly-ethers, and separating the resulting uranium-containing organic solvent phase from the thorium-containing aqueous phase.

9. A selective complexing-organic solvent extraction process for the separation and selective recovery of uranium values from an aqueous nitric acid solution of pH substantially within the range of 3.0 to 3.5 containing the same in the form of uranyl ions, together with dissolved thorium values, which comprises contacting said solution with sodium benzyl(phenyl)dithiocarbamate in amount in substantial excess over twice the molar concentration of uranyl ions, extracting resulting urano-dithiocarbamate complex with an organic solvent chosen from the group consisting of saturated aliphatic: ketones, esters, alcohols, and poly-ethers, and separating the resulting uranium-containing organic solvent phase from the thorium-containing aqueous phase.

10. A selective complexing-organic solvent extraction process for the separation and selective recovery of a microscopic concentration of uranium values from an aqueous nitric acid solution of pH of substantially 3 containing the same in the form of uranyl ions, together with a substantially one molar miaroscopic concentration of dissolved thorium values, which comprises contacting said solution with sodium ethyl(phenyl)dithiocarbamate in an amount in a molar excess of the order of 1000 to 10,000 times that of the uranyl ion concentration, extracting resulting urano-dithiocarbamate complex with a volume, substantially equal to that of said aqueous solution, of ethyl acetate, and separating the resulting uranium-containing acetate phase from the thorium-containing aqueous phase.

11. A selective complexing-organic solvent extraction process for the separation and selective recovery of uranium values from an acidic aqueous solution containing the same in the form of uranyl ions, together with dissolved protactinium values, which comprises contacting said solution with an aromatic dithiocarbamate of the general formula:

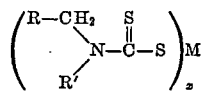

where:

R is an organic radical selected from the group consisting of aryl, aralkyl, and alkyl radicals;
R' is so selected from the group consisting of aryl and aralkyl radicals and a hydrogen atom that at least one of the radicals selected to constitute R and R' possesses a benzene ring structure;
M is a metal atom selected from the group consisting of the alkali and alkaline earth metals; and
$x$ is a number equal to the operative valence of the metal atom, M;

extracting resulting urano-dithiocarbamate complex with an organic solvent, and separating the resulting uranium-containing organic solvent phase from the protactinium-containing aqueous solution phase.

12. A selective complexing-organic solvent extraction process for the selective recovery of uranium values from an acidic aqueous solution containing the same in the form of uranyl ions, which comprises contacting said solution with an aromatic dithiocarbamate of the general formula:

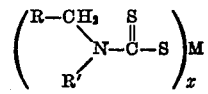

where:

R is an organic radical selected from the group consisting of aryl, aralkyl, and alkyl radicals;
R' is so selected from the group consisting of aryl and aralkyl radicals and a hydrogen atom that at least one of the respective radicals selected to constitute R and R' possesses a benzene ring structure;
M is a metal atom selected from the group consisting of the alkali and alkaline earth metals; and
$x$ is a number equal to the operative valence of the metal atom, M;

extracting resulting urano-dithiocarbamate complex with an organic solvent, separating the resulting uranium-containing organic solvent phase from the residual aqueous solution phase, and scrubbing the separated organic solvent phase with aqueous nitric acid, thereby stripping extracted uranium values therefrom.

13. In a process for the recovery of uranium values from an aqueous solution containing the same in the form of uranyl ions, comprising the organic solvent extraction of uranyl values from said solution, the improvement which comprises including in the organic solvent-aqueous solution system obtaining during said extraction operation an aromatic dithiocarbamate of the general formula:

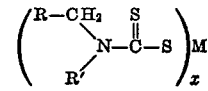

where:

R is an organic radical selected from the group consisting of aryl, aralkyl, and alkyl radicals;
R' is so selected from the group consisting of aryl and aralkyl radicals and a hydrogen atom, that at least one of the respective radicals selected to constitute R and R' possesses a benzene ring structure;
M is a metal atom selected from the group consisting of the alkali and alkaline earth metals; and
$x$ is a number equal to the operative valence of the metal atom, M;

thereby enhancing the uranium extraction efficiency of the process.

14. In a process for the recovery of uranium values from an aqueous solution containing the same in the form of uranyl ions, comprising the extraction of uranyl values from said solution with an organic solvent, the application of the improved solvent for accomplishing said extraction which comprises an organic solvent solution of an aromatic dithiocarbamate of the general formula:

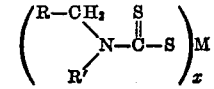

where:

R is an organic radical selected from the group consisting of aryl, aralkyl, and alkyl radicals;
R' is so selected from the group consisting of aryl and aralkyl radicals and a hydrogen atom that at least one of the respective radicals selected to constitute R and R' possesses a benzene ring structure;
M is a metal atom selected from the group consisting of the alkali and alkaline earth metals; and
$x$ is a number equal to the operative valence of the metal atom, M.

15. A method for forming an organic-solvent-soluble organic complex selectively with uranyl ions, which are contained in an aqueous solution together with thorium ions, which comprises incorporating into said solution an aromatic dithiocarbamate of the general formula:

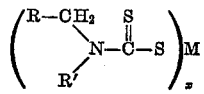

where:

R is an organic radical selected from the group consisting or aryl, aralkyl, and alkyl radicals;
R' is so selected from the group consisting of aryl and aralkyl radicals and a hydrogen atom that at least one of the respective radicals selected to constitute R and R' possesses a benzene ring structure;
M is a metal atom selected from the group consisting of the alkali and alkaline earth metals; and
$x$ is a number equal to the operative valence of the metal atom, M.

References Cited in the file of this patent

Harvey et al.: "The Chemistry of Plutonium," Journal of the Chemical Society (August 1947), page 1021 only.